United States Patent
Pateromichelakis et al.

(10) Patent No.: US 11,304,130 B2
(45) Date of Patent: Apr. 12, 2022

(54) CONTROL DEVICE AND ACCESS NODE FOR LICENSED ASSISTED ACCESS

(71) Applicant: Huawei Technologies Duesseldorf GmbH, Duesseldorf (DE)

(72) Inventors: Emmanouil Pateromichelakis, Munich (DE); Ömer Bulakci, Munich (DE); Chenghui Peng, Shanghai (CN)

(73) Assignee: Huawei Technologies Duesseldorf GmbH, Duesseldorf (DE)

( * ) Notice: Subject to any disclaimer, the term of this patent is extended or adjusted under 35 U.S.C. 154(b) by 128 days.

(21) Appl. No.: 16/696,427

(22) Filed: Nov. 26, 2019

(65) Prior Publication Data
US 2020/0100176 A1     Mar. 26, 2020

Related U.S. Application Data

(63) Continuation of application No. PCT/EP2017/062765, filed on May 26, 2017.

(51) Int. Cl.
*H04W 48/18* (2009.01)
*H04W 16/14* (2009.01)
(Continued)

(52) U.S. Cl.
CPC .......... *H04W 48/18* (2013.01); *H04W 16/14* (2013.01); *H04W 28/0268* (2013.01); *H04W 48/06* (2013.01); *H04W 74/0808* (2013.01)

(58) Field of Classification Search
CPC . H04W 48/18; H04W 16/14; H04W 28/0268; H04W 48/06; H04W 74/0808
See application file for complete search history.

(56) References Cited

U.S. PATENT DOCUMENTS

2011/0287794 A1   11/2011   Koskela et al.
2017/0070892 A1*   3/2017   Song ............... H04W 48/20
(Continued)

FOREIGN PATENT DOCUMENTS

EP   3190854 A1   7/2017
WO   2016036081 A1   3/2016

OTHER PUBLICATIONS

Anwer Al-Dulaimi, Saba Al-Rubaye, John Cosmas, and Alagan Anpalagan; Planning of Ultra-Dense Wireless Networks; Mar. 22, 2017; IEEE Network (Year: 2017).*
(Continued)

*Primary Examiner* — Ricky Q Ngo
*Assistant Examiner* — Stephen N Steiner
(74) *Attorney, Agent, or Firm* — Leydig, Voit & Mayer, Ltd.

(57) ABSTRACT

The present invention provides a control device for providing network-slice-aware licensed assisted access (LAA). The control device is configured to determine, for at least one slice-type, an unlicensed frequency band and/or an LAA configuration parameter. Furthermore, the control device is configured to provide, to at least one radio access node, configuration information comprising the determined frequency band and/or the LAA configuration parameter. The present invention also provides a radio access node for configuring network-slice-aware LAA. The radio access node is configured to receive, from a control device, configuration information comprising, for at least one slice-type, a frequency band and/or an LAA configuration parameter. The radio access node is further configured to request and receive, from a UE, a channel measurement report on one or more unlicensed frequency bands.

14 Claims, 8 Drawing Sheets

(51) Int. Cl.
    *H04W 28/02*     (2009.01)
    *H04W 48/06*     (2009.01)
    *H04W 74/08*     (2009.01)

(56) References Cited

U.S. PATENT DOCUMENTS

2019/0174561 A1*   6/2019   Sivavakeesar ........ H04W 48/12
2020/0267614 A1*   8/2020   Park ..................... H04W 36/38

OTHER PUBLICATIONS

"Report of email discussion:[97bis#14][NR] Slicing," 3GPP TSG-RAN WG2 #98, Hangzhou, China, R2-1704128, pp. 1-37, 3rd Generation Partnership Project, Valbonne, France (May 5-15, 2017).
"3rd Generation Partnership Project; Technical Specification Group Services and System Aspects; System Architecture for the 5G System; Stage 2 (Release 15)," 3GPP TS 23.501 V0.4.0, total 124 pages, 3rd Generation Partnership Project, Valbonne, France (Apr. 2017).

\* cited by examiner

| | eMBB Slice | URLLC1 Slice (e.g. urban area) | URLLC2 Slice (e.g. vertical factory) |
|---|---|---|---|
| CWS | Normal size | Small size (multiple attempts with small gaps) | |
| CCA Threshold | High threshold (e.g. -40dB) for higher spectrum re-use | Low threshold (e.g. -70dB) for less interference | No LBT |
| Burst Size | Maximum burst (depends on regulations) | Small burst (e.g. 1ms) | Small burst (e.g. 1ms) |
| Reservation Signals | RRM/CSI/RLM information Directional LBT mode indication Slice priority | RRM/CSI/RLM information Multi-connectivity information (Cell IDs, pre-allocated RBs) Slice priority | Signalling through primary cell |
| Spectrum | High Frequencies (>5 GHZ) | Low frequencies (carrier aggregation using redundant links over multiple low freq. bands) | Low frequencies (carrier aggregation over multiple low freq. bands) |
| Other parameters | Per carrier LBT HARQ through the same cell | LBT for all carriers HARQ through primary cell | HARQ through primary cell |

CONTROL DEVICE AND ACCESS NODE FOR LICENSED ASSISTED ACCESS

CROSS-REFERENCE TO RELATED APPLICATIONS

This application is a continuation of International Application No. PCT/EP2017/062765, filed on May 26, 2017, the disclosure of which is hereby incorporated by reference in its entirety.

TECHNICAL FIELD

The present invention relates to a control device and a radio access node for providing and configuring, respectively, Licensed Assisted Access (LAA). In particular, the LAA is provided and configured in a network-slice-aware manner. The present invention also relates to corresponding methods and to a system of a control device and a radio access node.

BACKGROUND

Network slicing is introduced in 5G, in order to address various requirements from multiple vertical industries assuming a shared network infrastructure. Network slicing allows network services to be customized based on the requirements of different use cases, and thus aims to significantly increase the network operation efficiency. Network slicing is an end-to-end concept. According to the current definition in 3GPP (see TR23.501), a network slice is a complete logical network that comprises a set of network functions and corresponding resources necessary to provide certain network capabilities and network characteristics. This includes both a 5G radio access network (RAN) and a 5G core network (CN).

Unlicensed cellular access (or, as defined in LTE for example, LAA) is already used in 4G LTE, and is envisioned as another key technology in 5G for improving RAN performance. In particular, New Radio (NR)-based unlicensed access is discussed as a key technology in 5G RAN. Thereby, different usage scenarios for unlicensed operations have been proposed, assuming that all sub-100 GHz unlicensed bands, including sub-1 GHz, 2.4 GHz, 5 GHz and 60 GHz, are taken into account to support these usage scenarios.

The main challenge in 4G LAA is that the interference in the 5 GHz bands (like radar, Wi-Fi etc.) can be very high and unpredictable. Other challenges are the LAA-Wi-Fi hidden terminal problem, and delays due to Listen Before Talk (LBT) in Heterogeneous Networks (HetNets). In 5G, even more challenges are foreseen, such as interference from sharing a shared spectrum in a variety of bands (from 1 GHz to 100 GHz), and ensuring a fair co-existence with other technologies currently occupying the unlicensed bands.

Furthermore, network slicing support and dynamic radio topologies (e.g. small cells, vehicular relays etc.) are so far not addressed for LAA. In particular, the main issues, which are yet to be addressed for the unlicensed assisted cellular operation in 5G, are described in the following.

A first main issue is, that in Ultra-Dense Networks (UDNs) with dynamic radio nodes (un-planned small cells, moving relays, nomadic nodes, drones, etc.), the utilization of 5G-LAA in an un-coordinated manner will cause (and suffer from) high interference caused by multiple heterogeneous sources. Therefore, 5G LAA needs to take into account changing radio topology conditions.

A second main issue is, that in network-slice-aware RANs where 5G LAA is used, the availability of the un-licensed bands, and un-predictable interference, will disparately impact per-slice Key Performance Indicators (KPIs). Fast coordination between multiple 5G nodes is thus required, in order to ensure that diverse and adaptive network slice requirements can be met. In such cases, the LAA should be adapted according to differing slice requirements.

SUMMARY

The present disclosure describes solutions that address the above-described challenges for providing and configuring LAA, particularly for providing and configuring network-slice-aware LAA. The present disclosure describes solutions that apply coordinated usage of unlicensed bands and network-slice-aware LAA configurations, in order to meet the demand from different verticals/slices. Additionally, the present disclosure describes solutions that improve the performance in radio access networks across slices, and introduces methods and apparatuses to realize the concept of 5G LAA-as-a-service, which is a slice-tailored on-demand operation of 5G LAA.

Since further different slice-types may bear multiple services with different KPIs, the configuration of the LAA should be decided such that it meets a per-slice Service Level Agreement (SLA). Since performance requirements identified by SLAs from one slice-type to another can be different and conflicting, a new criterion that will be required for 5G LAA is a fair co-existence in a slice-aware RAN (among verticals/slice-types).

Notably, a vertical is thereby anon-traditional service provider from the perspective of mobile and wireless communication networks. A vertical can be, for example, a factory owner, who requires ultra-reliable and low-latency communications (URLLC) between factory robots and backend, and may be associated with at least one slice-type and/or slice.

In particular, the present disclosure describes a level of complementary unlicensed spectrum usage, and a configuration of RAN and/or user equipment (UE) supporting LAA in 5G, that is network-slice-aware, in order to meet per-slice KPIs, and to ensure fair slice co-existence. To this end, dynamic topologies based on unplanned small cells provide new opportunities, but also challenges regarding the control information exchanged between users and a Base Station (BS) as a RAN node, and the impact of unlicensed band usage on the fixed deployments.

A first aspect of the present invention provides a control device for providing network-slice-aware LAA, the control device being configured to determine, for one slice-type or for each of multiple slice-types, an unlicensed frequency band and/or an LAA configuration parameter, and to provide, to at least one radio access node, configuration information comprising the determined frequency band and/or LAA configuration parameter.

By the control device of the first aspect, network-slice-aware LAA configuration information is provided, which is crucial for enabling slice-aware LAA. Namely, with this configuration information, the radio access node is able to configure one or more UEs for LAA in a slice-aware manner. Configuring LAA depending on the slice-type leads to a higher spectrum utilization in a slice-aware RAN, and to the ability to meet diverse per-slice SLAs using unlicensed bands. At the same time, a fair co-existence with other technologies, which operate at the unlicensed bands (4G LAA, Wi-Fi, etc.) is enabled.

Furthermore, the slice-aware LAA configuration fits well with the flexible slice isolation/sharing at RAN, and can enable slice-tailored activation and scheduling of unlicensed dynamic access nodes "on demand", in order to meet per-slice KPIs. This can be referred to as dynamic LAA-as-a-Service.

Providing the slice-dependent LAA configuration further helps reduce the signalling overhead, especially for small cells and/or unplanned cells, wherein UEs belonging to different slice owners can frequently change, e.g. due to small coverage area.

In an implementation form of the first aspect, the control device is configured to determine the one or more unlicensed frequency bands and/or LAA configuration parameters based on at least one of a slice-type requirement, a channel measurement, an availability of unlicensed bands, location information, and slice traffic information.

Thus, an improved configuration of slice-aware LAA is enabled.

In a further implementation form of the first aspect, the configuration information comprises a look-up table (LUT), which includes the frequency band and/or LAA configuration parameter.

The LUT provides a simple and efficient implementation for the configuration information. It can be updated with low signaling load.

In a further implementation form of the first aspect, the control device is further configured to determine, for the one slice-type or for each of the multiple slice-types, a LBT usage parameter indicating whether LBT is to be used or not, wherein the LAA configuration parameter comprises the LBT usage parameter.

Therefore, LBT is enabled for the slice-aware LAA.

In a further implementation form of the first aspect, the control device is further configured to determine, for each slice-type for which it is determined that LBT is to be used, a LBT configuration parameter, particularly a clear channel assessment (CCA) Timer, and/or a CCA threshold and/or a LBT Mode, wherein the LAA configuration parameter comprises the LBT configuration parameter.

This allows LBT to be enabled in the most efficient manner.

In a further implementation form of the first aspect, the LAA configuration parameter comprises a proposed maximum burst size, and/or a proposed time gap between transmissions, and/or a proposed format of a reservation signal.

These LAA configuration parameters allow for configuration of LAA meeting different slice-dependent KPIs.

In a further implementation form of the first aspect, the control device is further configured to provide, for at least one slice-instance of at least one slice-type, a weighting factor or a list of weighting factors for updating the configuration information for the at least one slice-type.

Accordingly, only the weighting factors need to be transmitted, not a complete new version of the configuration information, thus reducing the signaling load.

In a further implementation form of the first aspect, the control device is further configured to receive at least one service request and/or slice instantiation request related to at least one slice-type, and determine, for each related slice-type, the unlicensed frequency band and/or LAA configuration parameter, when the service request and/or slice instantiation request is received.

In a further implementation form of the first aspect, the control device is further configured to provide the configuration information to the at least one radio access node during or after handover of a UE to the at least one radio access node.

A second aspect of the present invention provides a radio access node for configuring network-slice-aware LAA, the radio access node being configured to receive, from a control device, configuration information comprising, for one slice-type or for each of multiple slice-types, a frequency band and/or a LAA configuration parameter, request and receive, from a UE a channel measurement report on one or more unlicensed frequency bands, determine at least one suitable slice-type for the UE according to Quality of Service (QoS) and/or quality of experience (QoE) requirements of the UE and radio resource conditions and/or availability, determine, according to the at least one suitable slice-type, a LAA configuration based on the configuration information and the UE measurement report, and provide, to the UE, a configuration instruction comprising the determined LAA configuration.

The radio access node is thus able to configure the UE for LAA in a network-slice-aware manner. Thereby, QoS and/or QoE requirements are respected, leading to an improved network performance.

In an implementation form of the second aspect, the radio access node is further configured to receive a weighting factor or a list of weighting factors for at least one slice-instance of at least one slice-type, update the LAA configuration for this at least one slice-type based on the weighting factor or list of weighting factors and the configuration information.

The usage of weighting factors reduces the signaling load, and allows for fast updating.

In a further implementation form of the second aspect, the configuration information comprises an LUT, which includes, for each of the one or more slice-types, the frequency band and/or the LAA configuration parameter.

The LUT provides a simple and efficient implementation for the configuration information. It can be updated with low signaling load.

In a further implementation form of the second aspect, the LAA configuration parameter comprises a proposed maximum burst size, and/or a proposed gap between transmissions, and/or a proposed format of a reservation signal, and/or an LBT configuration parameter.

A third aspect of the present invention provides a system comprising a control device according to the first aspect and any one of its implementation forms and a radio access node according to the second aspect and any one of its implementation forms.

A fourth aspect of the present invention provides a method for proving network-slice-aware LAA, wherein the method comprises determining, for one slice-type or for each of multiple slice-types, an unlicensed frequency band and/or a LAA configuration parameter, and providing, to at least one radio access node, configuration information comprising the determined frequency band and/or LAA configuration parameter.

In an implementation form of the fourth aspect, the method comprises determining the one or more unlicensed frequency bands and/or LAA configuration parameters based on at least one of a slice-type requirement, a channel measurement, availability of unlicensed bands, location information, and slice traffic information.

In a further implementation form of the fourth aspect, the configuration information comprises an LUT, which includes the frequency band and/or LAA configuration parameter.

In a further implementation form of the fourth aspect, the method further comprises determining, for the one slice-type or for each of the multiple slice-types, an LBT usage parameter indicating whether LBT is to be used or not, wherein the LAA configuration parameter comprises the LBT usage parameter.

In a further implementation form of the fourth aspect, the method further comprises determining, for each slice-type for which it is determined that LBT is to be used, an LBT configuration parameter, particularly a CCA Timer, and/or a CCA Threshold and/or a LBT Mode, wherein the LAA configuration parameter comprises the LBT configuration parameter.

In a further implementation form of the fourth aspect, the LAA configuration parameter comprises a proposed maximum burst size, and/or a proposed time gap between transmissions, and/or a proposed format of a reservation signal.

In a further implementation form of the fourth aspect, the method further comprises providing, for at least one slice-instance of at least one slice-type, a weighting factor or a list of weighting factors to update the configuration information for the at least one slice-type.

In a further implementation form of the fourth aspect, the method further comprises receiving at least one service request and/or slice instantiation request related to at least one slice-type, determining, for each related slice-type, the unlicensed frequency band and/or LAA configuration parameter, when the service request and/or slice instantiation request is received.

In a further implementation form of the fourth aspect, the method further comprises providing the configuration information to the at least one radio access node during or after handover of a UE to the at least one radio access node.

The method of the fourth aspect and its implementation forms achieve the same advantages and effects as the control device of the first aspect and its implementation forms, respectively.

A fifth aspect of the present invention provides a method for configuring network-slice-aware LAA, wherein the method comprises receiving, from a control device, configuration information comprising, for one slice-type or for each of multiple slice-types, a frequency band and/or an LAA configuration parameter, requesting and receiving, from a UE, a channel measurement report on one or more unlicensed frequency bands, determining at least one suitable slice-type for the UE according to QoS and/or QoE requirements of the UE and radio resource conditions and/or availability, determining, for the at least one suitable slice-type, an LAA configuration based on the configuration information and the UE measurement, and providing, to the UE, a configuration instruction comprising the determined LAA configuration.

In an implementation form of the fifth aspect, the method further comprises receiving a weighting factor or a list of weighting factors for at least one slice-instance of at least one slice-type, updating the LAA configuration for this at least one slice-type based on the weighting factor or list of weighting factors and the configuration information.

In a further implementation form of the fifth aspect, the configuration information comprises an LUT, which includes, for each of the one or more slice-types, the frequency band and/or the LAA configuration parameter.

In a further implementation form of the fifth aspect, the LAA configuration parameter comprises a proposed maximum burst size, and/or a proposed gap between transmissions, and/or a proposed format of a reservation signal, and/or an LBT configuration parameter.

The method of the fifth aspect and its implementation forms achieve the same advantages and effects as the radio access node of the second aspect and its implementation forms, respectively.

Devices, elements, units, and means described in the present application can be implemented in software or hardware elements or any combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF THE DRAWINGS

Above described aspects and implementation forms of the present invention will be explained in the following description of specific embodiments in relation to the enclosed drawings, in which:

FIG. 3 shows configuration information in the form of an LUT;

DETAILED DESCRIPTION OF THE EMBODIMENTS

Figure 1:
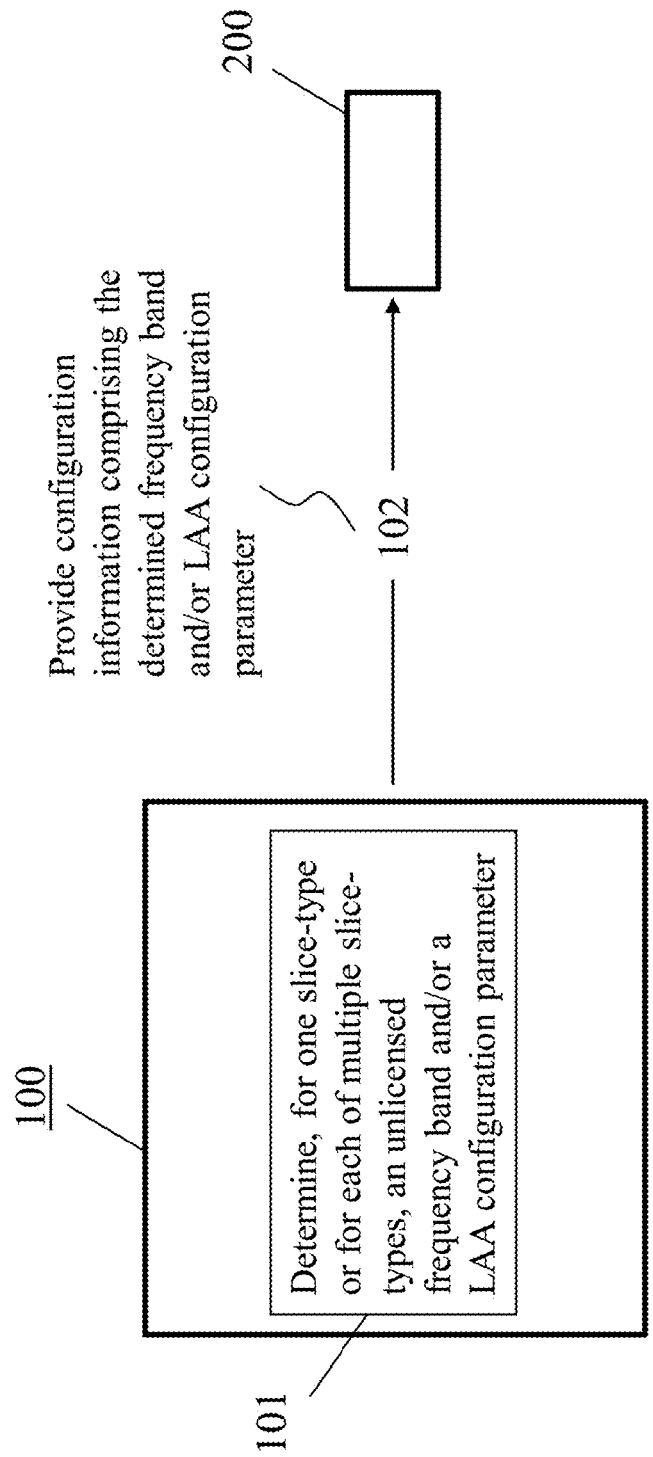
FIG. 1 highlights a control device according to an embodiment of the present invention.

FIG. 1 shows a control device 100 according to an embodiment of the present invention, which is configured to provide network slice-aware LAA. To this end, the control device 100 is configured to implement a method according to an embodiment of the present invention.

In particular, the control device 100, which may be a BS or may be included in or associated with a BS, is configured to determine 101 (corresponding to a first method step), for one slice-type or for each of multiple slice-types, an unlicensed frequency band and/or an LAA configuration parameter. That is, the control device 100 is configured to decide on an unlicensed band and/or an LAA configuration parameter for a given slice-type. The determination by the control device 100 may be triggered by some kind of event, for instance, a slice instantiation request received by the control device 100.

Then, the control device is configured to provide 102 (corresponding to a second method step) the configuration information comprising the determined frequency band and/or LAA configuration parameter to at least one radio access node 200. The radio access node 200 may be an access node of a small cell, and may be associated with the control device 100 and/or with its associated BS. The configuration parameter may present a configuration command from the control device 100 (e.g. a macro-cell BS) to the radio access node 200 (e.g. a small cell access node). Preferably, the configuration information comprises an LUT 300, which includes at least the frequency band and/or LAA configuration parameter.

Figure 2:
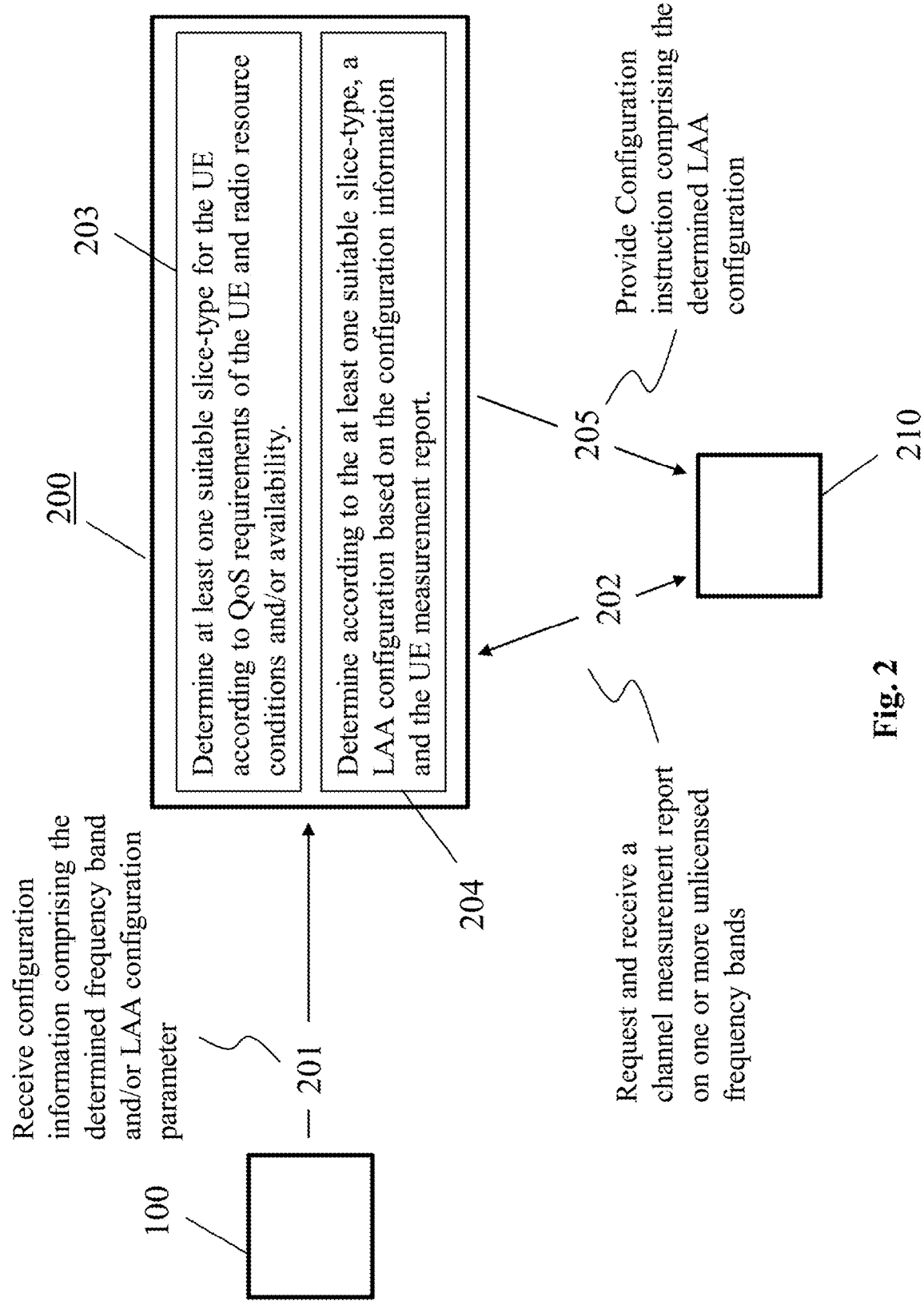
FIG. 2 highlights a radio access node according to an embodiment of the present invention.

The radio access node 200 according to an embodiment of the present invention is shown in FIG. 2, and is configured to configure the network-slice-aware LAA. To this end, the radio access node 200 is configured to implement another method according to an embodiment of the present invention.

In particular, the radio access node 200 is configured to receive 201 (corresponding to a first method step), from a control device 100, configuration information comprising, for one slice-type or for each of multiple slice-types, a frequency band and/or an LAA configuration parameter. Then, the radio access node 200 is configured to request and receive 202 (corresponding to a second method step), from at least one UE 210 a channel measurement report on one or more unlicensed frequency bands. The UE 210 may be associated with the radio access node 200.

Further, the radio access node 200 is configured to determine 203 (corresponding to a third method step) at least one suitable slice-type for the UE 210 according to QoS requirements of the UE 210 and radio resource conditions and/or availability. Also, the radio access node 200 is configured to determine 204 (corresponding to a fourth method step) according to the at least one suitable slice-type, an LAA configuration based on the configuration information and the UE measurement report. That is, the radio access node 200 is configured to decide on a specific LAA design that is subject to the configuration information and the UE measurement, respectively.

Finally, the radio access node 200 is configured to provide 205 (corresponding to a fifth method step), a configuration instruction comprising the determined LAA configuration to the UE 210. According to this configuration instruction, the UE 210 may be configured for LAA in a slice-aware manner, i.e. slice-type-dependent. The configuration instruction may comprise a configuration command (from small cell access node to UE) for a transition from, for example a Frame/Load Based Equipment (FBE/LBE) to a Slice Based Equipment (SBE), and may also comprise associated parameters.

The main idea implemented by the above-described control device 100 and radio access node 200, respectively, is the slice-tailored LAA operation and configuration. In particular, the idea enables slice-tailored LAA operation, for instance, in 5G NR, and inter-slice control functionality, when more than one slice accesses an unlicensed band. The idea also enables Slice Based Equipment (SBE) functionality, which allows for slice-tailored optimized LAA operation for radio access nodes 200 and UEs 210, respectively.

The LAA configuration can include specifically the following:

The selection of one or more unlicensed bands, which are more preferable to be used per slice/slice-type, given also load and traffic conditions (from 1 GHz-100 GHz) in these bands. Notably, slice-type refers to a group of network slices consisting of at least one network slice, where the slices in the group have some similar characteristic performance requirements based on the type of services they enclose, for example, enhanced mobile broadband (eMBB) slice-type and ultra-reliable and low-latency communications (URLLC) slice-types.

The decision, whether to use LBT or not, and which LBT type is to be supported (e.g. selection among different LBT designs). As an example, for some critical slices with good isolation (e.g. low Wi-Fi access point density), LBT can be omitted to reduce latency, single carrier vs. multi-carrier LBT etc.

The configuration of LBT, if supported (timers, thresholds, reservation signals), subject to the slice-type it belongs to.

The level of coordination of LAA operation on-demand, subject to the resource situation (channel conditions, resource availability, traffic, level of complementary usage spectrum) and RAN/Slice/UE context changes, to minimize interference (centralized vs. distributed functionality to enable optimized inter-cell resource allocation) and optimize the performance.

The LAA configuration parameters can include specifically the following. Depending on the per-slice traffic (data rate, delay and coverage requirements) at least one of the following parameters may be adjusted:

A spectrum (unlicensed frequency) to be considered.

A slice-adaptive transmission burst size. The burst size should be adapted based on the slice-type. For example, for eMBB, preferably configurations with large bursts are scheduled, whereas for URLLC, preferably small bursts are scheduled. Also, multiple slices within a burst may require allocation of resources efficiently to meet per slice-type KPIs.

Gaps between transmissions may be different based on the fact that for some slice-types traffic could be continuous or bursty.

Reservation signals can be sent as per slice-type information prior to data transmissions, in order to identify the configuration parameters above.

LBT decision (Yes/No).

In case of LBT (Yes): CCA Timer (extended or normal). CCA is a key part of LBT design, where the LAA device performs energy detection to sense the channel before transmission. Extended CCA could be triggered, even if the channel is sensed clear to ensure ultra-high reliability for URLLC.

CCA Threshold. A higher threshold can give higher cell throughput. Therefore, the CCA Threshold should be higher for eMBB slices.

LBT Mode (e.g. single-carrier vs. multi-carrier LBT, directional vs. omni-directional LBT Mode).

FIG. 3 presents an example of configuration information in the form of an LUT, specifically for three characteristic slices (eMBB, URLLC 1—urban, URLLC 2—isolated environment, e.g. for a vertical factory). In particular, for each slice-type (separated into columns of the LUT 300), different configuration parameters, as explained above, are specified (in the rows of the LUT 300), including contention window size (CWS), CCA threshold, burst size, reservation signals, spectrum, and other parameters.

Most preferably, the LAA configuration parameter for each slice-type comprises at least a proposed maximum burst size, and/or a proposed time gap between transmissions, and/or a proposed format of a reservation signal.

Figure 4:
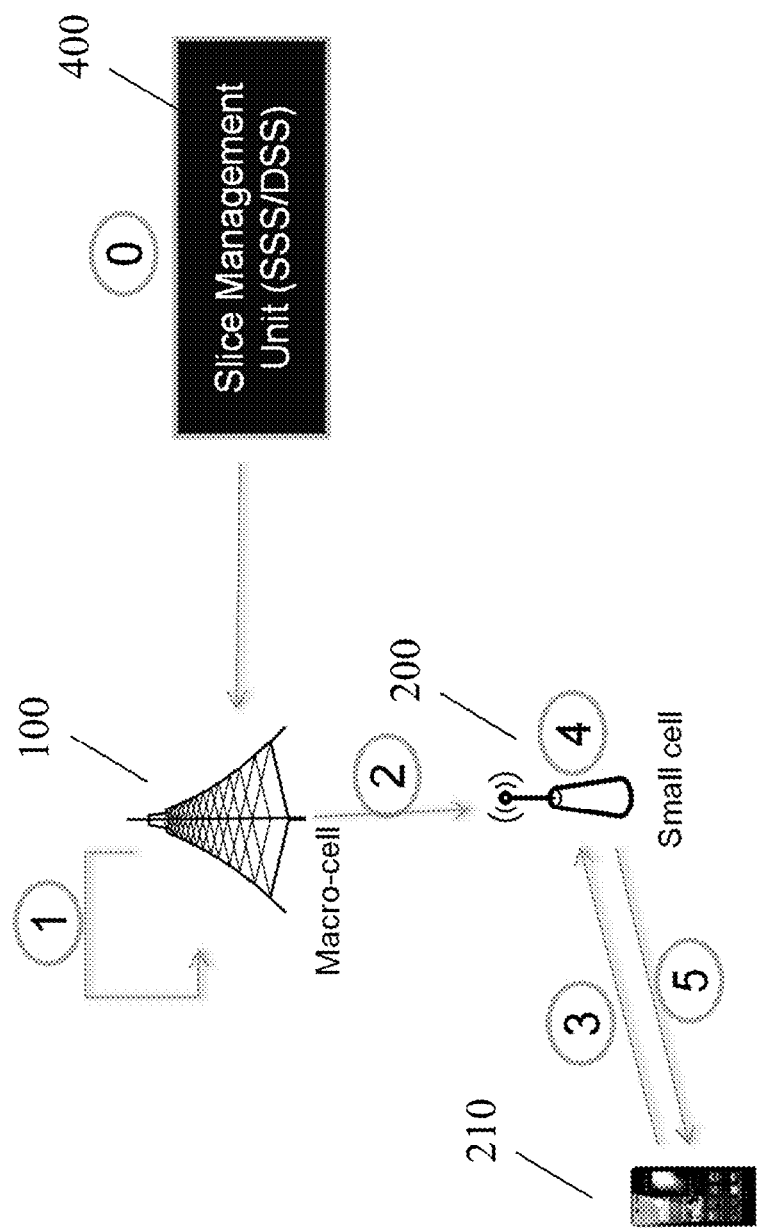
FIG. 4 shows a method carried out by a system of a control device and a radio access node according to an embodiment of the present invention.

FIG. 4 shows a system of a control device 100 and a radio access node 200 according to an embodiment of the present invention. Here, the control device 100 is, specifically, a BS of a macro-cell, and the radio access node 200 is an access node of a small cell. The UE 210 is a mobile communication device. The system can carry out the following method.

The BS 100 may receive (indicated by 0) from a slice management unit 400 (SSS/DSS) a trigger event, for instance a slice instantiation request. Upon this request, the BS 100 determines (indicated by 1) an unlicensed frequency band and/or a LAA configuration parameter, either for one slice-type or for each of multiple slice-types. The BS 100 then provides (indicated by 2) the small cell access node 200 with configuration information comprising the determined frequency band and/or the LAA configuration parameter, preferably in the form of a LUT 300 as shown, for example, in FIG. 3. After receiving this configuration information, the small cell access node 200 requests and receives (indicated by 3) a measurement report form the UE 210 that is to be configured for LAA. The node 200 then decides (indicated by 5) on a LAA configuration for the UE 210. This decision is subject to a slice-type suitable for the UE 210 and the UE measurement report. A suitable slice-type can particularly be determined based on QoS requirements of the UE 210, radio resource conditions, and/or availability. Then, the access node 200 sends to the UE 210 a configuration instruction comprising the LAA configuration.

Figure 5:
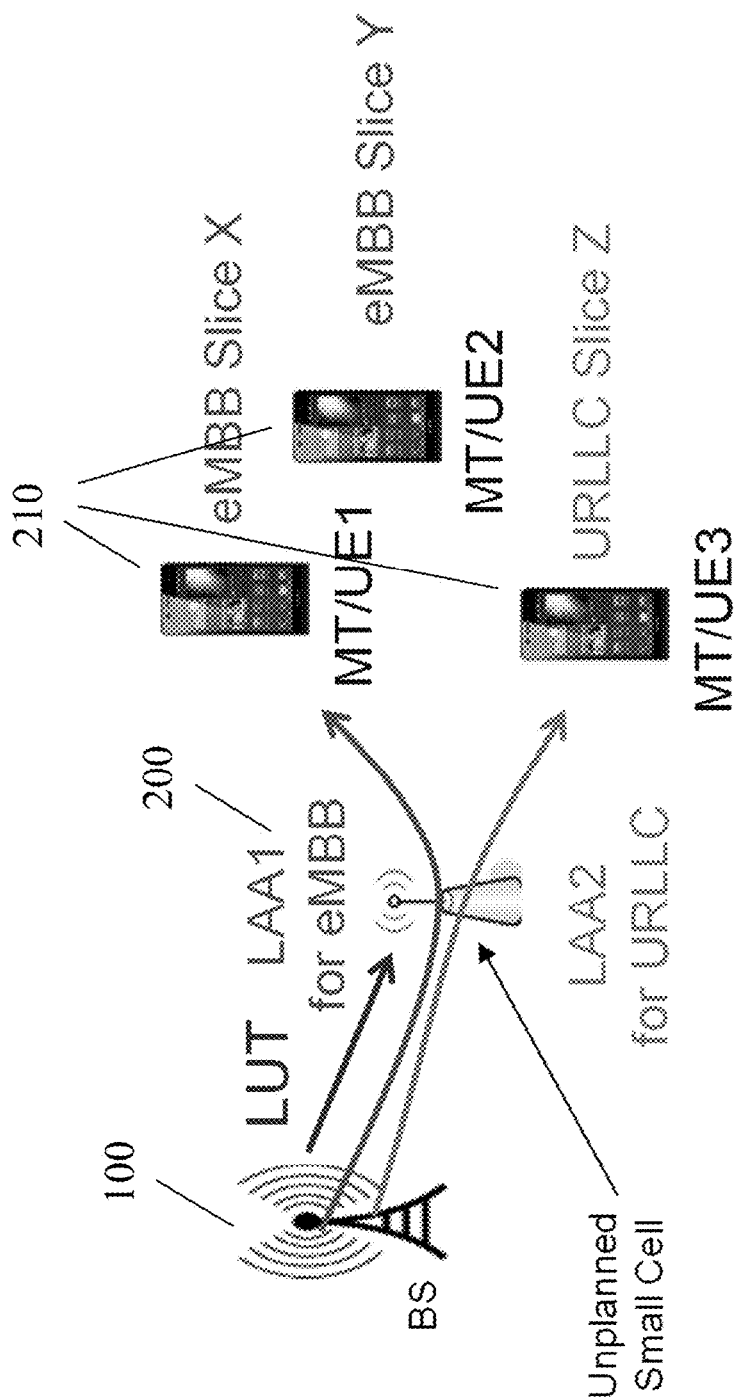
FIG. 5 shows an exemplary method carried out by a system of a control device and a radio access node according to an embodiment of the present invention for a single-slice UE.

FIG. 5 shows an exemplary method carried out by the system of control device 100 and a radio access node 200 in case of one or more single-slice UEs 210. That is, here is assumed that the UEs 210 support only one network slice at the same time.

The control device 100, here again in the form of a macro-cell BS, provides the configuration information, preferably an LUT 300, to the radio access node 200, here again a small cell access node. This happens preferably during a slice instantiation phase. Based on the received configuration information, and a slice-type suitable for the UE 210, the small cell access node 200 uses the LAA configuration per slice, and informs the UEs 210 accordingly.

Figure 6:
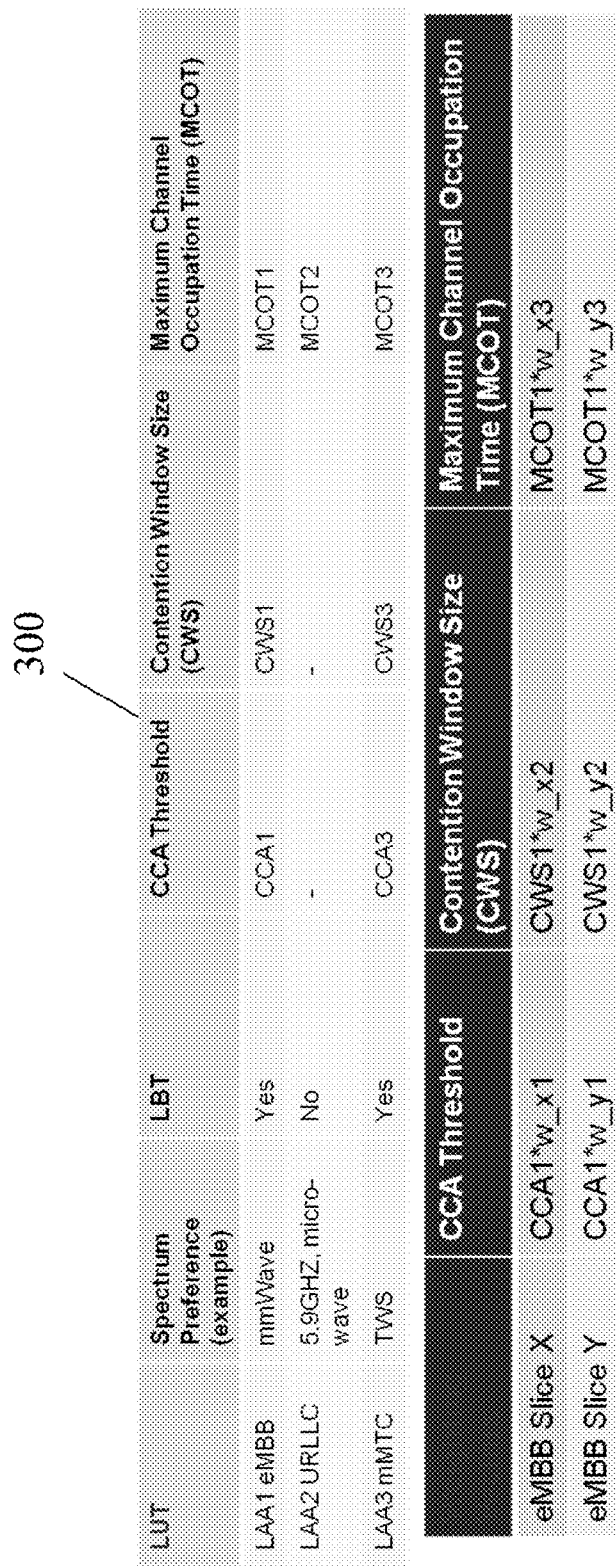
FIG. 6 shows an exemplary slice-type-specific LUT and slice-specific weighting factors, respectively.

FIG. 6 shows another exemplary LUT 300 that can be used as the configuration information, particularly for three different slices with aforementioned parameters. In order to reduce the signalling overhead, the LUT 300 is slice-type specific. Depending on the slices associated with UEs 210 served by the small cell access node 200, weighting factors or a list of weighting factors 600 can advantageously be used, and preferably only the weighting factors 600 are sent for different slices of the UEs 210. That means, the control device 100 may provide, for at least one slice-instance of at least one slice-type, a weighting factor or a list of weighting factors 600 to the radio access node 200, in order to update the configuration information for the at least one slice-type.

For instance, in the case that LBT is supported, and for different slice instances (here in FIG. 6 are shown eMBB Slice X, eMBB Slice Y), the small cell access node 200 uses some weighting factors 600 as updates on the LUT 300 given, e.g., the real-time changes to further configure parameters like the CCA threshold, the contention window size (CWS) and maximum channel occupation time (MCOT).

Figure 7:
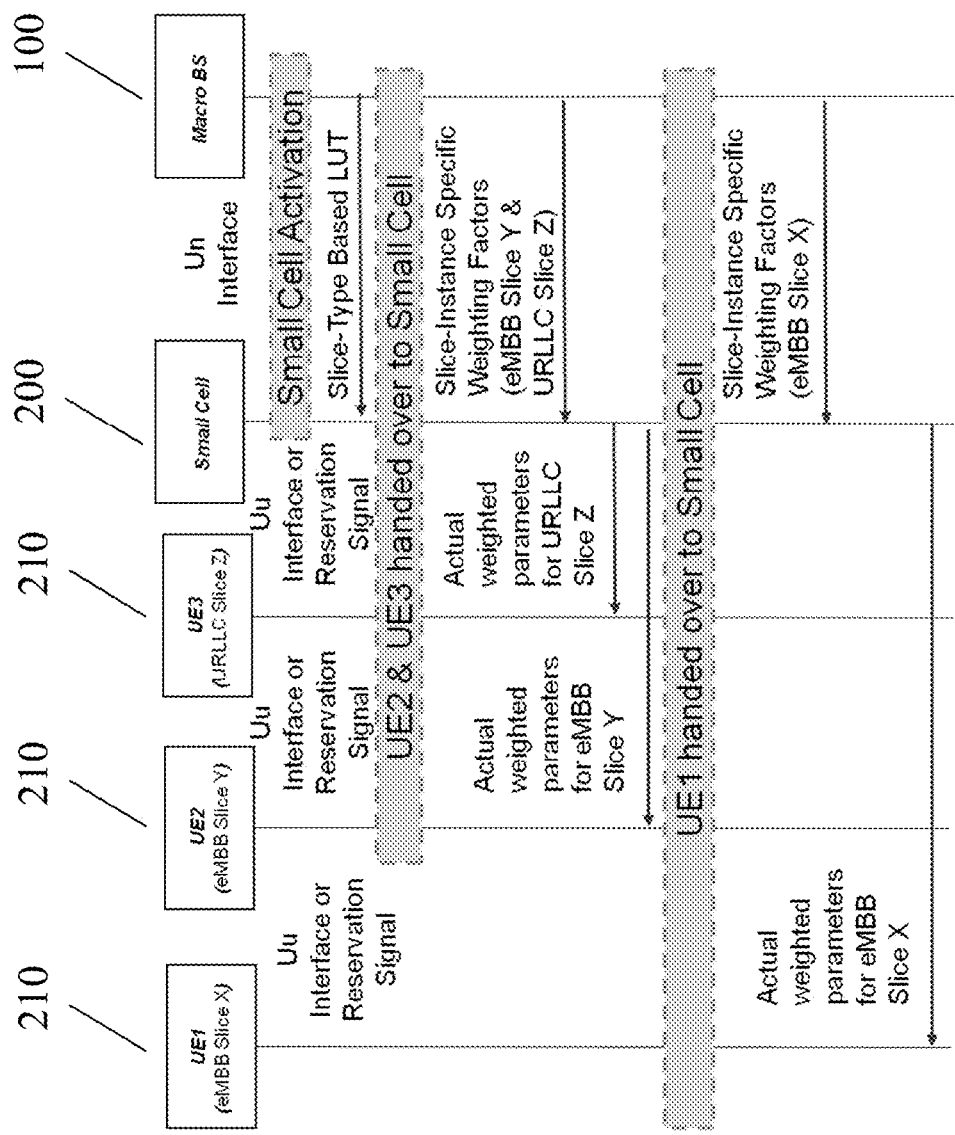
FIG. 7 shows a message sequence for a method carried out by a system of a control device and a radio access node according to an embodiment of the present invention for single-slice UEs.

In FIG. 7, a message sequence is presented for the case of single-slice UEs 210. Upon a small cell activation, a new message is the slice-type based configuration information (LUT) message. As soon as the UE 210 is handed over to the small cell access node 200, the macro-cell BS 100 sends, for instance, via an Xn interface, the slice-instance specific weighting factors 600. These are processed at the small cell access node 200, i.e. the small cell access node 200 updates the LAA configuration for this at least one slice-type based on the weighting factor or list of weighting factors 600 and based on the configuration information. The updated LAA configuration is then forwarded to the UE 210, preferably via a Uu interface (or by reservation signal). The UE 210 then uses the updated LAA configuration to operate in one or more unlicensed bands.

By sending the slice-type specific configuration information (here the LUT 300) at the small cell activation, and not e.g. while changing UE 210 associations to the small cell access node 200, signalling overhead can be reduced. When a new slice-type is introduced, or when the LUT 300 needs to be updated, new configuration information can be sent.

Notably, the Xn interface is a logical interface between access nodes, for example, such an interface is referred to as X2 in LTE. Furthermore, in case of self-backhauled or wireless backhauled small cells, the interface between the macro-cell BS 100 and the small cell access node 200 can be similar to the Un interface as in LTE. Herein, slice and slice instance are interchangeably utilized.

Figure 8:
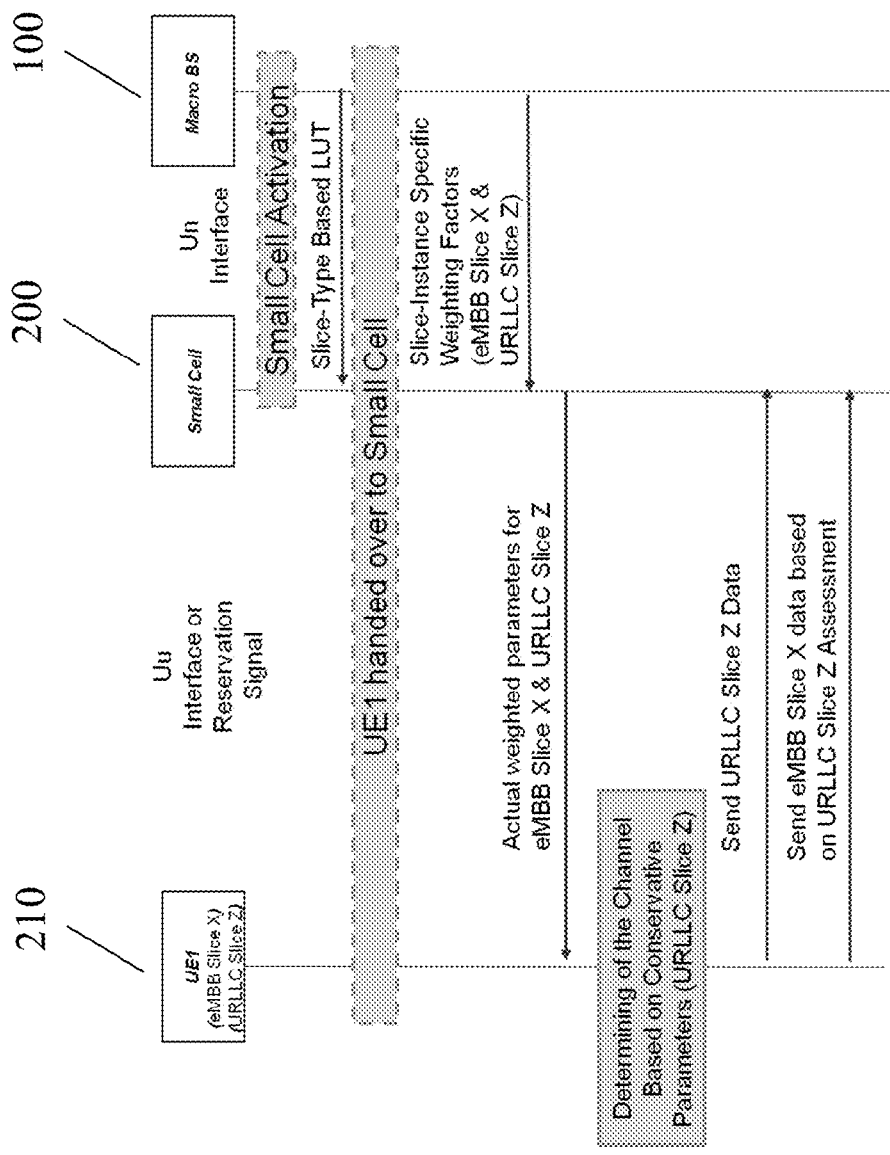
FIG. 8 shows a message sequence for a method carried out by a system of a control device and a radio access node according to an embodiment of the present invention for multi-slice UEs.

FIG. 8 shows another message sequence for the case of UEs 210 associated with multiple slices. That is, a UE 210 can support more than one network slice at the same time. In this case, part of the above-mentioned steps can be applied. After the UE 210 is handed over to the small cell access node 200, and after it is determined that the UE 210 is associated with multiple slices, slice-specific weighting factors 600 can be obtained from the macro-cell BS 100. This can also be performed on a request basis. The UE 210 receives parameters for the associated multiple slices.

Depending on the unlicensed band(s) to be utilized, different slice configurations may be applied. For example, when the same unlicensed band is utilized for different slices of the UE 210, the UE 210 may apply a more conservative slice configuration of at least two slice configurations, and may assess the channel based on parameters of the conservative configuration. In case of different carrier frequencies, still different configurations per slice and per carrier may be applied.

The present invention has been described in conjunction with various embodiments as examples as well as implementations. However, other variations can be understood and effected by those persons skilled in the art from studies of the drawings, this disclosure, and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A control device for providing network-slice-aware Licensed Assisted Access (LAA), the control device comprising:
 a processor being configured to:
  determine, for at least one slice type, an unlicensed frequency band and/or an LAA configuration parameter,
  provide, to at least one radio access node, configuration information comprising the determined unlicensed frequency band and/or the determined LAA configuration parameter, and determine, for the at least one slice type, a listen before talk (LBT) usage parameter indicating whether LBT is to be used or not, wherein the LAA configuration parameter comprises the LBT usage parameter.

2. The control device according to claim 1, the processor being configured to:

determine the unlicensed frequency band and/or the LAA configuration parameter based on at least one of a slice type requirement, a channel measurement, an availability of unlicensed bands, location information, or slice traffic information.

3. The control device according to claim 1, wherein the configuration information comprises a look-up table that includes the unlicensed frequency band and/or the LAA configuration parameter.

4. The control device according to claim 1, the processor being further configured to:

determine, for the at least one slice type for which it is determined that LBT is to be used, an LBT configuration parameter, wherein the LAA configuration parameter further comprises the LBT configuration parameter.

5. The control device according to claim 1, wherein the LAA configuration parameter further comprises at least one of a proposed maximum burst size, a proposed time gap between transmissions, or a proposed format of a reservation signal.

6. The control device according to claim 1, the processor being further configured to:

provide, for at least one slice instance of at least the at least one slice type, a weighting factor or a list of weighting factors for updating the configuration information for the at least one slice type.

7. The control device according to claim 1, the processor being further configured to:

receive at least one service request and/or slice instantiation request related to the at least one slice type, determine, for each respective related slice type, a respective unlicensed frequency band and/or a respective LAA configuration parameter, when the service request and/or the slice instantiation request is received.

8. The control device according to claim 1, the processor being further configured to:

provide the configuration information to the at least one radio access node during or after handover of a user equipment (UE) to the at least one radio access node.

9. A system comprising:

the control device according to claim 1, and a radio access node for configuring network-slice-aware licensed assisted access (LAA), the radio access node being configured to:

receive, from the control device, configuration information comprising, for at least one slice type, a frequency band and/or an LAA configuration parameter, request and receive, from a user equipment (UE), a channel measurement report on one or more unlicensed frequency bands, determine at least one suitable slice type for the UE according to quality of service (QoS) requirements of the UE and radio resource conditions and/or availability, determine, according to the at least one suitable slice type, an LAA configuration based on the configuration information and the channel measurement report, and provide, to the UE, a configuration instruction comprising the determined LAA configuration.

10. The system according to claim 9, further configured to:

receive a weighting factor or a list of weighting factors for at least one slice instance of the at least one slice type, and update the LAA configuration for the at least one slice type based on the weighting factor or the list of weighting factors and the configuration information.

11. The system according to claim 9, wherein the configuration information comprises a look-up table which includes, for the at least one slice type, the frequency band and/or the LAA configuration parameter.

12. The system according to claim 9, wherein the LAA configuration parameter comprises at least one of a proposed maximum burst size, a proposed gap between transmissions, a proposed format of a reservation signal, or a listen before talk (LBT) configuration parameter.

13. A method for providing network-slice-aware licensed assisted access (LAA), the method comprising:

determining, for at least one slice type, an unlicensed frequency band and/or an LAA configuration parameter, providing, to at least one radio access node, configuration information comprising the determined unlicensed frequency band and/or the LAA configuration parameter, and determining, for the at least one slice type, a listen before talk (LBT) usage parameter indicating whether LBT is to be used or not, wherein the LAA configuration parameter comprises the LBT usage parameter.

14. The control device according to claim 4, wherein the LBT configuration parameter is a clear channel assessment (CCA) timer, a CCA threshold, and/or a LBT mode.

* * * * *